United States Patent [19]

Afanador et al.

[11] 4,022,300
[45] May 10, 1977

[54] MECHANICAL DISC BRAKE

[75] Inventors: Carlos P. Afanador, Centerville; Chester N. Fannin, Troy, both of Ohio

[73] Assignee: Dayton-Walther Corporation, Dayton, Ohio

[22] Filed: Aug. 19, 1976

[21] Appl. No.: 715,932

[52] U.S. Cl. .................. 188/72.1; 188/71.9; 188/72.8; 188/79.5 K; 192/93 R; 192/94

[51] Int. Cl.[2] ........................... F16D 55/08

[58] Field of Search ............ 188/72.1, 71.9, 72.7, 188/72.8, 72.9, 79.5 K, 347, 348; 192/93 R, 93 H, 94; 74/479

[56] References Cited

UNITED STATES PATENTS

| | | | |
|---|---|---|---|
| 1,612,356 | 12/1926 | Bregoz | 188/72.8 |
| 3,322,235 | 5/1967 | Forbush | 188/79.5 K |
| 3,638,763 | 2/1974 | Laverdant | 188/71.9 |
| 3,650,364 | 3/1972 | Laing | 188/347 |
| 3,851,737 | 12/1974 | Hewins | 188/71.9 |
| 3,900,084 | 8/1975 | Farr | 188/71.9 |
| 3,920,102 | 11/1975 | Ito | 188/72.8 |
| 3,976,168 | 8/1976 | Yamamoto | 188/71.9 |

*Primary Examiner*—Trygve M. Blix
*Assistant Examiner*—Edward R. Kazenske
*Attorney, Agent, or Firm*—Biebel, French & Nauman

[57] ABSTRACT

An air actuated disc brake incorporates a power screw mechanism for applying a braking force and a mechanical rapid advance mechanism which is operated during the initial rotation of the power screw for advancing the screw and a piston-shaped nut axially to take up at least a major portion of the running clearance of the brake.

7 Claims, 8 Drawing Figures

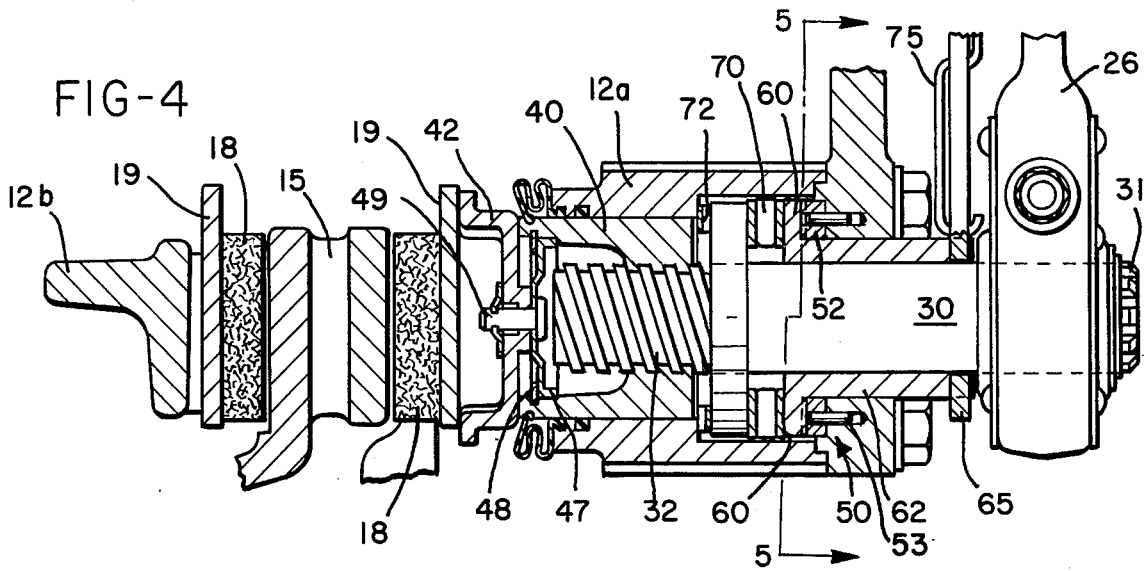
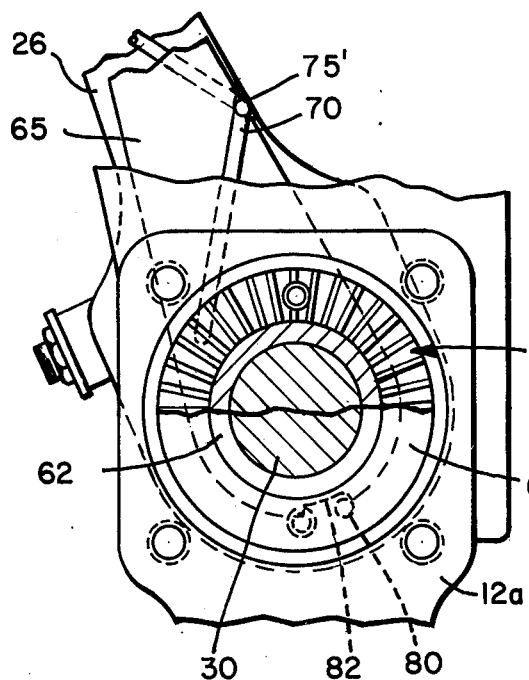
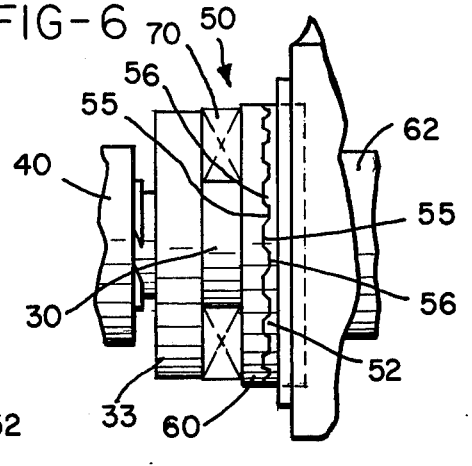
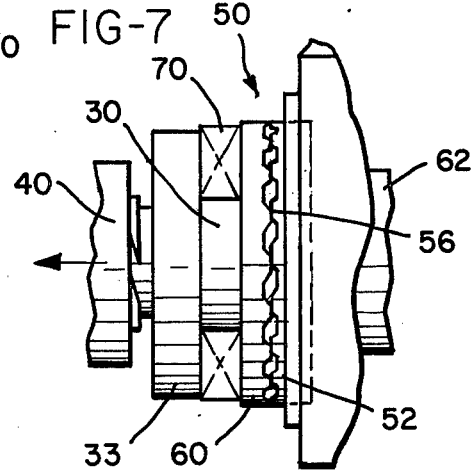
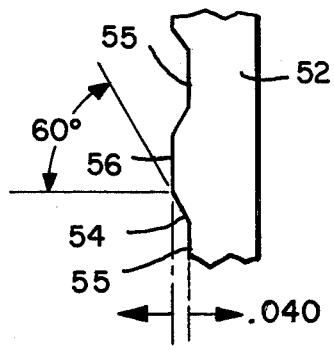

MECHANICAL DISC BRAKE

BACKGROUND OF THE INVENTION

Mechanical disc brakes incorporating power screws have the advantage of efficiently applying large braking force to the friction pad. Such disc brakes of the limited area or spot-type have application for use in truck, and tractor-trailer combinations which already incorporate an air compressor for operation of the brakes and the suspension. Commonly, such air systems are regulated to about 90–100 psi with a maximum output of about 120 psi. However, hydraulic brakes operate with hydraulic pressures up to 1,800 psi or more, and accordingly, the force output of the braking system in an air-operated disc brake must be comparable to the ranges of forces which can be obtained with an 1,800 psi hydraulic system. Typically, piston areas in such hydraulic systems may be around fifteen square inches with pads of around twenty square inches per pad. The total piston area may be distributed among two or more pistons.

In adapting disc brakes to the pneumatic systems now existing and in common use on truck and tractor-trailer combinations, it is desired to make use of the standard air actuator chambers which are now commonly in use. These air chambers provide from twelve to thirty-six inches of effective area exposed to the pneumatic pressure, and generally are limited to a relatively short working stroke, such as about two and one-fourth inches.

Due to the limited stroke available from conventional air actuators or chambers, it has been found either necessary to limit the running clearances of the brake to a minimum, reduce the lever arm length, or otherwise reduce the mechanical advantage in order to insure against running out of stroke. However, it is desirable to maintain an adequate running clearance particularly in large heavy-duty brakes which are used on tractors or semi-trailers since the provision of an adequate running clearance enhances the cooling of the brake, and assures against a dragging brake condition.

It is known to use ball and ramp arrangements in mechanically-operated disc brakes, as shown in U.S. Pat. Nos. 3,059,731, 3,110,364, 3,115,217 and 3,638,763. It is also known to provide the ramp with varying slope characteristics to obtain a desired rate of force application. In such brakes, the reactive forces must be transmitted from one ramp member to the other through the balls. While ball and ramp actuators have had some success, they are severely limited by the high pressures and wear which occur on the ball ramp in high force applications. Further, such arrangements are inherently costly to manufacture.

Lead screws have also been suggested as a force applying mechanism in disc brakes, as shown for example in U.S. Pat. Nos. 1,612,356 and 3,647,015. The power screw has the advantage of simplicity, high efficiency and long service life.

It has also been known for many years in hydraulic brakes to use compound cylinders or pistons to take up the running clearance rapidly and thereafter to apply a higher force as shown, for example, in U.S. Pat. No. 3,650,364.

SUMMARY OF THE INVENTION

The present invention is directed to a compound mechanical brake which employs cooperating cam members on the one hand and a power screw on the other hand to take up the clearance and to apply the brake. Cooperating cam members operate during the initial movement of the lever arm attached to the lead screw to effect rapid advancement of the lead screw and the attached nut thereon in such a way as to take up a major portion of the running clearance of the brake while utilizing a minimum amount of travel of the air cylinder. Thereafter, the remaining running clearance, if any, and the application of the brake, is made effectively through a power screw arrangement. Release of the brake results in the reversal of these movements, that is, the retraction of the nut of the power screw followed by the return of the rapid actuating cam to its initial position, thereby reestablishing the desired running clearance for the brake parts.

An important object of this invention therefore is the provision of a mechanical brake, which may be air operated, in which the stroke of the air cylinder is optimized by a rapid advance mechanism which comes into play with the initial movement of the air cylinder and which is thereafter locked or retained in its advanced position while brake force is applied through a power screw arrangement.

Another object of the invention is the provision of a compound motion mechanical actuator for a disc brake.

A further object of the invention is the provision of a two-stroke mechanical actuator for a disc brake for rapidly taking up the brake clearance and thereafter applying a high mechanical advantage in the operation of the brake.

While the preferred embodiment shown in particularly adapted for use with conventional air cylinders, it is understood that the principles herein may be used for other types of mechanical brakes whether or not an air cylinder is used for actuation.

These and other objects and advantages of the invention will be apparent from the following description, the accompanying drwings and the appended claims.

BRIEF DESCRIPTION OF THE DRAWINGS

FIG. 4 is a longitudinal section through the actuator mechanism;

FIG. 5 is a vertical section taken generally along the line 5—5 of FIG. 4;

FIG. 6 is a somewhat diagrammatic view showing the rapid advance mechanism in the retracted position with the thrust bearing omitted for clarity of illustration;

FIG. 7 is a view similar to FIG. 6 but showing the rapid advance mechanism in the advanced position; and FIG. 8 is a fragmentary view of a portion of one of the cam plates of the rapid advance mechanism.

DESCRIPTION OF THE PREFERRED EMBODIMENT

Figure 1:
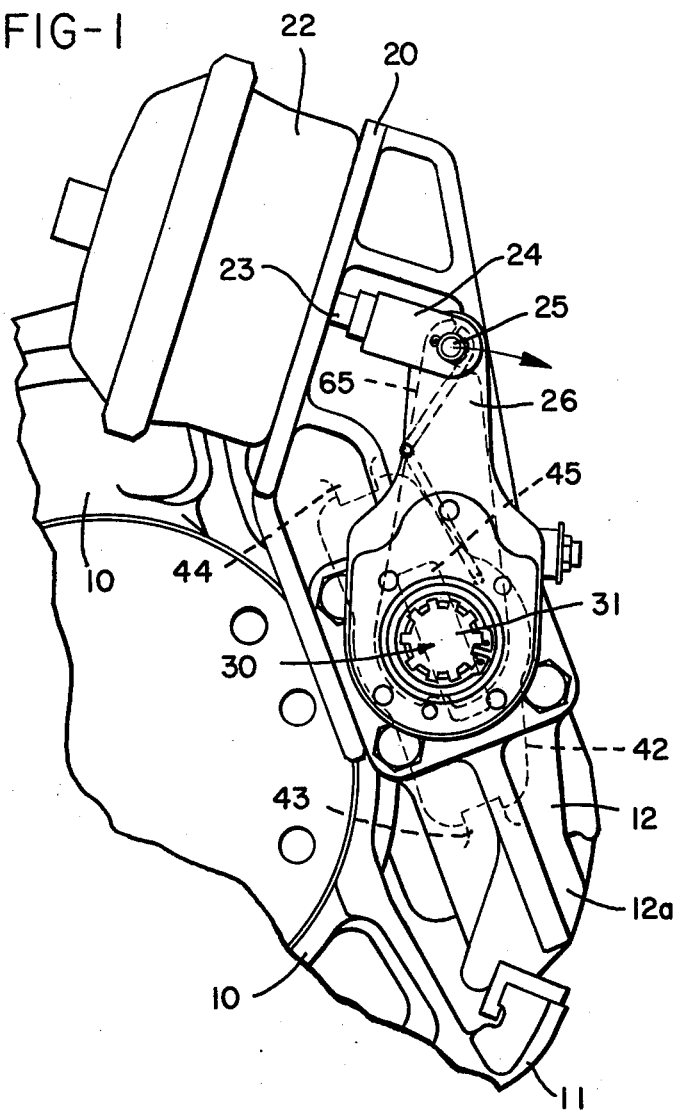
FIG. 1 is a partially broken away elevational view of this invention.
Figure 2:
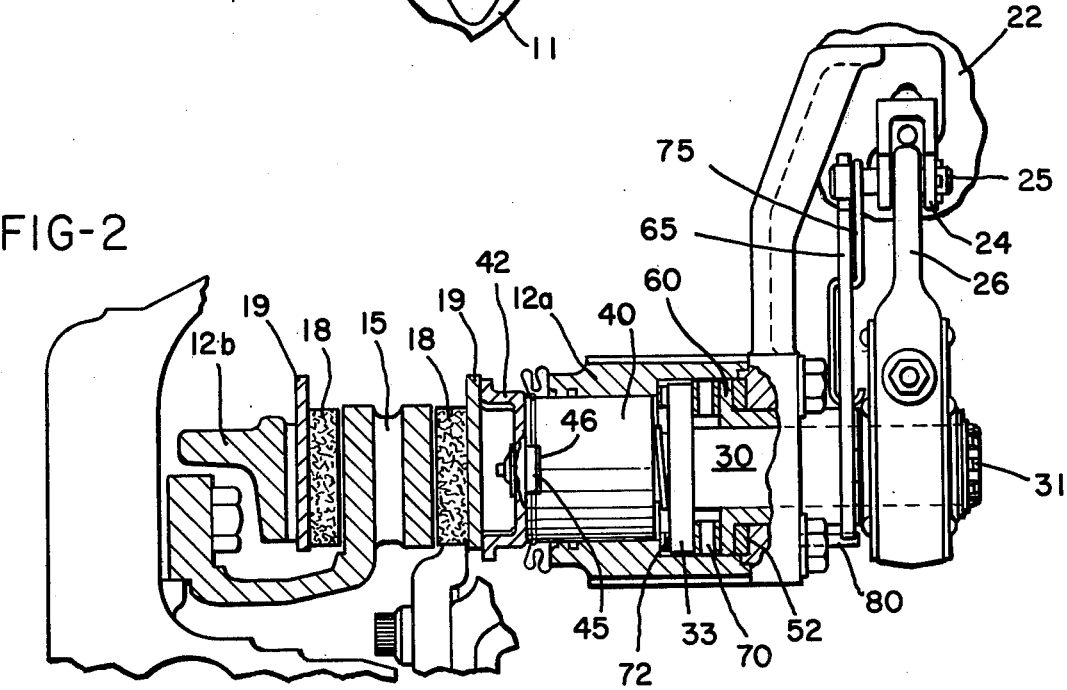
FIG. 2 shows the brake of FIG. 1 in side elevation with a portion thereof being broken away and shown in section to illustrate some of the parts.

A disc brake is illustrated generally at FIGS. 1 and 2 as including a fixed torque member 10 which includes opposite torque arms 11, with only one of such arms being shown. A floating caliper 12 is mounted on the arms 11 by any suitable means for axial movement thereon. The caliper includes a pressure housing portion 12a positioned on one side of a ventilated disc 15 and a reaction housing portion 12b positioned on the opposite side of the disc, as shown in FIG. 2. The caliper 12 conventionally supports a pair of friction pads 8 on opposite sides of the disc, said pads 18 being attached to conventional backing plates 19. The mounting of the caliper housing and support of the backing plates may be as shown in U.S. Pat. No. 3,800,923.

The housing portion 12a is provided with a mounting pad 20, as shown in FIG. 1, on which is mounted a conventional air actuator chamber 22. The air chamber 22 may, for example, be a size No. 12 or any other suitable size, with an extending rod 23 terminating in a clevis 24. The clevis 24 is attached by means of a clevis pin 25 to a primary brake actuating arm 26, as best seen in FIG. 2. The arm 26 is, in turn, slidably mounted on the splined end 31 of a power shaft 30. The shaft 30 is perhaps best seen in FIG. 4. The splined end 31 extends outwardly of the housing portion 12a and supports the arms 26. A threaded lead screw section 32 is formed at the forward end thereof, and an annular thrust collar 33 is positioned immediately inwardly of the threaded section 32.

The means for applying braking force to the friction pads includes a threaded piston or cylindrical nut 40 which is slidably received within a bore within the housing 12. The piston 40 is threaded on the screw section 32, and the threads on the screw section and piston may be of the multiple-start type.

The piston 40, while mounted for sliding movement within the caliper portion 12a, is prevented from rotating so that it moves only axially upon rotation of the shaft 30. For this purpose the piston 40 is keyed and thus coupled to a generally channel-shaped pressure plate 42 as shown in section in FIGS. 2 and 4 and in outline section in FIG. 1. The plate 42 may be guided within the housing portion 12a for axial movement by any suitable means, such as by the pair of bosses 43 and 44 (FIG. 1) received in notches at the opposite ends of the plate 42.

The open side of the plate 42 faces and bears directly against the adjacent backing plate 19. The backside thereof is formed with a pressed out transverse, key-shaped portion 45 (FIGS. 2 and 4) which extends only partially the transverse length of the plate 40. This key portion 45 is received within a corresponding transverse slot 46, as shown in FIG. 2, formed in the forward open end of the piston 40. The key 45 thus engages the piston 40 at the slot 46 and prevents rotation of the piston. Preferably, the piston 40 and pressure plate 42 are coupled together so that retraction of the piston 40 also causes retraction of the pressure plate 42, and for this purpose, a disc 47 (FIG. 4) is trapped within the open forward end of the piston by a snap ring 48. The disc 47 is couled to the pressure plate 42 by any suitable removable fastener such as the clipped stud rivet 49.

As noted above, the air actuator 22 aplies the brake by rotating the lever 26 which results in axial movement of the piston 40 in a brake-applying direction. Preferably, for the purpose of conventional slack adjustment, the arm 26 contains an internal one-way ratchet mechanism (not shown) by means of which the relative angular position of the arm 26 to the shaft 30 may be changed during retraction, as necessary.

The invention further includes a secondary or fast motion actuator or mechanism 50 in the housing 12a to effect a rapid limited axial displacement of the shaft 30 and piston 40 thereon concurrently upon the initial rotation by the arm 26, for the purpose of taking up at least a major portion of the running clearance of the brake. For example, 75 percent of the running clearance may be taken up about 10° or less of rotation of the shaft 30 by the fast advance mechanism 50, as shown in FIGS. 4-7. For this purpose, there is provided an annular cam plate 52 mounted in fixed relation to a rear wall of the housing portion 12a by locating pins 53 (FIG. 4). The cam plate 52 is formed with an annular series of radially-extending axially-inclined cam surfaces 54 thereon. Each cam surface 54 extends from a radially flat valley 55 to a flat crest 56 as shown in FIG. 8.

Figure 3:
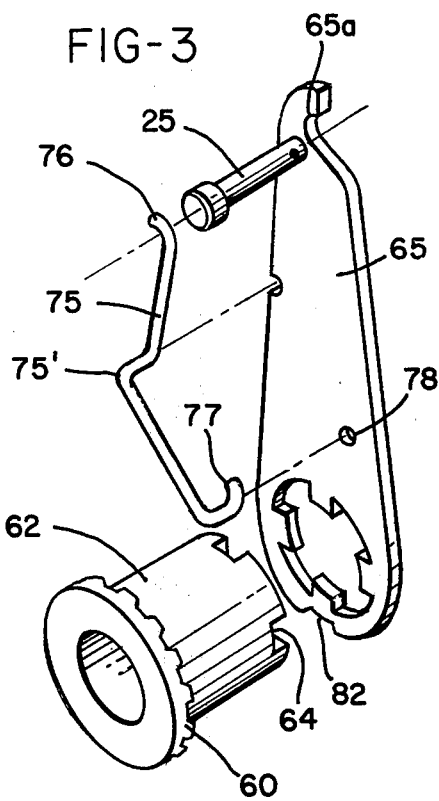
FIG. 3 is a perspective view of the actuating lever for the fast advance mechanism and a portion of the lever mechanism.

A mating and interfitting annular cam plate 60 is formed with an annular cam surface identical with that of the plate 52 and is positioned in mating relation with the plate 52. However, the cam plate 60 is fixably attached to, or is formed as an integral part of, a sleeve 62. The sleeve 62 extends through the annular plate 52 and has an inside surface rotatably mounted on the shaft 30. The exposed outer end of the sleeve 62 is splined at 64 (FIG. 3) to accept a secondary operating arm 65 advantageously positioned between the arm 26 and the adjacent caliper housing. The arrangement is such that rotation of the sleeve 62 by the arm 65 will cause the cam plate to move from its normally seated position as shown in FIG. 6 to a moved position as shown in FIG. 7 in which the opposed flat crests 56 are resting against each other. This movement will necessarily result in an axial displacement of the cam plate 60 corresponding to the axial depth of the cam surfaces 54 which in the example shown in FIG. 8, may be about 0.040 of a inch.

The means for transmitting the axial movement of the cam plate 60 to effect corresponding axial movements of the shaft 30 includes an annular thrust bearing 70 positioned between the back surface of the plate 60 and the adjacent radial face of the thrust collar 33. This axial motion is opposed by a wavy spring 72 interposed between the opposite radial face of the thrust collar 33 and the housing 12a.

The secondary operating arm 65 is coupled by means of a bent wire spring 75 (FIGS. 3 and 4) to the clevis pin 25. The upper end 76 of the spring 75 forms a partial loop about the pin 25 and lies adjacent the outside surface of the arm 65. The spring 75 pivots at the arm 65 at a crossover portion 75' and has a lower end 77 received within an opening 78 formed in the arm 65. The rotation of the arm 65 is limited to the extent necessary to move the cam plates 52 and 60 from the interfitted or rest position shown in FIG. 6 to the spread apart or actuated position shown in FIG. 7, which may, for example, require only 15° or less of arm rotation. Means for thus limiting the cam and arm rotation through an angle corresponding to the angular spacing of an adjacent pair of valleys and crests comprises a pin 80 (FIG. 5) on the caliper housing 12a cooperating with a slot 82 formed in the arm 65. The slot and pin arrangement defines the arcuate movement of the arm 65 to that necessary to bring the cam parts into flat crest-to-crest engagement as shown in FIG. 7. Thereafter, the arm 65 is prevented from further rotation while the arm 26 is free to continue its rotation by deflecting the spring 75 about the pivot 75' to apply the brake through the power screw and threaded piston arrangement.

Positive retraction of the arm 65 and the associated cam plate 60 to its seated position is assured by reason of the upper end 65a of the arm 65 being re-engaged by the clevis pin 25 during the last portion of the retraction of the arm 26 to the retracted position. Also, the wavy spring 72 and the wire spring 75 cooperate to retract the shaft 30 and to bring the cam plate 60 back to its seated position on the plates 52.

It will be seen that the reaction thrust when the brake is applied is transmitted by the thrust collar 33 and the bearing 70 through the fast advance mechanism 50. In this position, the crests 56 are opposed to each other, and accordingly, there is very little wear occurring at the cam plates. The extent of axial advance and retraction affected by the limited rotation of the plate 60 on the plate 52, as defined by the length of the slot 82, is preferably less than that necessary to take up all of the running clearance of the brake. Preferably 75 percent of the running clearance may thus be rapidly taken up with the initial movement of the arm 26 and this axial movement is accomplished by physically shifting of the shaft 30 axially by an amount equal to the depth of the cam surfaces. Retraction to the rest position shown in FIG. 6 is assured by the engagement of the pin 25 with the arm portion 65a, while retraction of the shaft 30 and the attached nut 40 is assured by the wavy spring 72.

One of the advantages of the present invention is that the initial rapid advance moves the plate 60 to a second stable position on the plate 52 before the brake is fully applied. The movement is primarily for the purpose of taking up and reestablishing brake running clearance. There is thus minimum wear on the faces 54 as the larger reaction forces are carried by the flat crests 56.

While the form of apparatus herein described constitutes a preferred embodiment of this invention, it is to be understood that the invention is not limited to this precise form of apparatus, and that changes may be made therein without departing from the scope of the invention.

What is claimed is:

1. A two-stage mechanical actuator for a disc brake for rapidly taking up brake running clearance and thereafter applying high mechanical advantage in the application of the brake, comprising a caliper housing, an internally threaded piston slidably received in said housing and having a forward end portion thereof adapted to apply braking force to an adjacent pad of friction material, a threaded actuating shaft in said housing rotatably engaged with the threads of said piston and having a rearward portion extending externally of said housing so that rotation of said shaft results in axial movement of said piston, means mounting said shaft in said housing for limited axial movement, a secondary actuator coacting with said shaft for causing said axial movement thereof including a rotatable member positioned coaxially of said shaft and a fixed member, cooperating cam means between said members providing for limited axial movement of said rotatable member upon rotation thereof, thrust means coupling said rotatable member to said shaft for transmitting said limited axial movement to said shaft, and means for rotating said rotatable member concurrently with the initial rotation of said shaft when applying the brake to take up at least a substantial portion of said running clearance.

2. A two-stage mechanical actuator for a disc brake for rapidly taking up brake running clearance and thereafter applying high mechanical advantage in the application of the brake, comprising a caliper housing, an internally threaded piston slidably received in said housing and having a forward end portion thereof adapted to apply braking force to an adjacent pad of friction material, a piston actuating shaft in said housing having a multiple start-type thread thereon rotatably engaged with the threads of said piston and having a rearward portion extending externally of said housing so that rotation of said shaft results in axial movement of said piston, means mounting said shaft in said housing for limited axial movement, and a fast motion actuator in said housing including first annular cam plate means fixed in relation to said housing, second annular cam plate means in opposed relation to said first cam plate means and in thrusttransmitting relation to said shaft, and means connecting said second cam plate means for limited angular rotation with the initial rotation of said shaft to effect a rapid axial displacement of said shaft and piston thereon to take up at least a major portion of the running clearance of said brake.

3. A rapid advance mechanical actuator for a disc brake for taking up brake clearance and thereafter applying the brake, comprising a caliper housing, an internally threaded nut slidably received in said housing and having a forward end portion adapted to apply a braking force to an adjacent pad of friction material, a nut actuating shaft in said housing having a forward threaded end rotatably engaged with the threads of said nut so that rotation of said shaft results in axial movement of said nut, a lever on said shaft remote from said threaded end, an air cylinder mounted on said housing and connected to said lever to rotate said shaft, means mounting said shaft in said housing for limited axial movement, a secondary actuator co-acting with said shaft for effecting said axial movement thereof including a rotatable member, non-rotatable member adjacent said rotatable member, said secondary actuator members having cooperating cam means therebetween providing for axial movement of one of said members upon rotation of said rotatable member, means coupling said one member to said shaft for transmitting said axial movement to said shaft, and means for rotating said rotatable member concurrently with the initial rotation of said shaft by said air cylinder in applying the brake to take up a substantial portion of the running clearance of said brake.

4. A rapid advance mechanical actuator for a disc brake for taking up brake clearance and thereafter applying the brake, compising a caliper housing, an internally threaded nut slidably received in said housing and having a forward end portion adapted to apply a braking force to an adjacent pad of friction material, a nut actuating shaft in said housing having a forward threaded end rotatably engaged with the threads of said nut so that rotation of said shaft results in axial movement of said nut, a lever on said shaft remote from said threaded end, an air cylinder mounted on said housing and connected to said lever to rotate said shaft, means mounting said shaft in said housing for limited axial movement, a secondary actuator for effecting initial axial movement of said shaft during initial rotation thereof including a rotatable cam member in thrust transmitting relation to said shaft and a non-rotatable cam member, said cam members having adjacent cooperating cam surfaces thereon in normally seated relation movable to an actuated relatively displaced relation upon limited rotation of said rotatable cam member, and means for rotating said rotatable cam member including a cam operating arm mounted on said rotatable member, and resilient means connecting said arm to said lever to cause said arm to follow the rotation of said lever upon actuation of said air cylinder during initial movement of said lever only, and stop means on said secondary actuator defining the extent of rotation of said rotatable member and arm.

5. The brake actuator of claim 4 in which said lever has a portion directly engageable with said arm upon retraction thereof to return said cam means to their normally seated position.

6. The actuator of claim 4 further comprising a one-way clutch in said lever operable upon retraction thereof to reposition said lever on said shaft for taking up brake wear.

7. A two-stage mechanical actuator for a disc brake for rapidly taking up brake clearance and thereafter applying high mechanical advantage in the application of the brake, comprising a caliper housing, an internally threaded piston slidably received in said housing and adapted to apply braking force to an adjacent pad of friction material, a threaded piston actuating shaft in said housing rotatably engaged with the threads of said piston and having rearward portion extending externally of said housing, a lever on said shaft rearward portion, means mounting said shaft in said housing for limited axial movement, and a fast motion actuator in said housing including first annular cam plate means fixed in relation to said housing, second annular cam plate means in opposed relation to said first plate means and in thrust-transmitting relation to said shaft, said cam plates each having an opposed annular set of radially flat valleys separated from a set of radially flat crests by a set of inclined cam surfaces, arm means connected to said second cam plate means and moved by the initial movement of said lever to effect angular rotation of said second cam plate means concurrently with the initial rotation of said lever to effect movement of the opposed crests into juxtaposition accompanied by corresponding axial movement of said shaft and piston to take up a major portion of the running clearance of said brake.

* * * * *